(12) United States Patent
Bernard

(10) Patent No.: US 7,178,760 B2
(45) Date of Patent: Feb. 20, 2007

(54) METHOD AND APPARATUS FOR INHIBITING ACCRETION OF AIRBORNE MATERIAL ON A SURFACE OF AN AIRCRAFT

(75) Inventor: Guy Bernard, Kirkland (CA)

(73) Assignee: Bombardier Aéronautique, Dorval (CA)

( * ) Notice: Subject to any disclaimer, the term of this patent is extended or adjusted under 35 U.S.C. 154(b) by 227 days.

(21) Appl. No.: 10/856,939

(22) Filed: Jun. 1, 2004

(65) Prior Publication Data

US 2005/0141996 A1    Jun. 30, 2005

Related U.S. Application Data

(60) Provisional application No. 60/474,215, filed on May 30, 2003.

(51) Int. Cl.
*B64D 15/16* (2006.01)

(52) U.S. Cl. ............................. 244/134 E; 244/134 A

(58) Field of Classification Search ............ 244/134 R, 244/134 A, 134 E
See application file for complete search history.

(56) References Cited

U.S. PATENT DOCUMENTS

| | | | |
|---|---|---|---|
| 2,028,669 A * | 1/1936 | Hiscock | 244/134 A |
| 2,399,648 A * | 5/1946 | Love | 244/134 A |
| 5,547,150 A | 8/1996 | Adams et al. | |
| 5,558,304 A | 9/1996 | Adams | |
| 5,590,854 A * | 1/1997 | Shatz | 244/206 |
| 5,765,779 A | 6/1998 | Hancock et al. | |
| 5,767,605 A | 6/1998 | Giamati | |
| 5,845,878 A | 12/1998 | Rauckhorst, III et al. | |
| 5,899,085 A | 5/1999 | Williams | |
| 5,904,322 A | 5/1999 | Giamati et al. | |
| 5,921,502 A | 7/1999 | Al-Khalil et al. | |
| 5,944,287 A | 8/1999 | Rodgers | |
| 6,027,075 A | 2/2000 | Petrenko | |
| 6,102,333 A | 8/2000 | Gerardi et al. | |
| 6,124,571 A | 9/2000 | Miller et al. | |
| 6,129,314 A | 10/2000 | Giamati et al. | |
| 6,140,942 A | 10/2000 | Bragg et al. | |
| 6,196,500 B1 | 3/2001 | Al-Khalil et al. | |
| 6,227,492 B1 | 5/2001 | Schellhase et al. | |
| 6,237,874 B1 | 5/2001 | Rutherford et al. | |
| 6,250,587 B1 | 6/2001 | Schramm et al. | |
| 6,265,057 B1 | 7/2001 | Giamati | |
| 6,267,328 B1 | 7/2001 | Vest | |
| 6,279,856 B1 | 8/2001 | Rutherford et al. | |
| 6,283,411 B1 | 9/2001 | Giamati et al. | |
| 6,330,986 B1 | 12/2001 | Rutherford et al. | |
| 6,354,538 B1 | 3/2002 | Chilukuri | |
| 6,362,135 B1 | 3/2002 | Greer | |
| RE38,024 E | 3/2003 | Adams et al. | |
| 6,702,233 B1 | 3/2004 | DuPont | |
| 6,704,625 B2 | 3/2004 | Albero et al. | |
| 6,820,841 B2 | 11/2004 | Mittereder et al. | |
| 2001/0023909 A1 | 9/2001 | Laught | |

* cited by examiner

*Primary Examiner*—Timothy D. Collins

(57) ABSTRACT

An apparatus for inhibiting accretion of airborne material on a surface of an aircraft. The apparatus comprises a film adapted to overlie at least a portion of the aircraft surface and a driver mechanism coupled to the film. The driver mechanism is operative to slideably move the film relative to the aircraft surface, such that airborne material impinging on the film detaches itself and breaks away therefrom. In a particular example of implementation, the apparatus is adapted and used for inhibiting accretion of airborne material on an airfoil leading edge.

52 Claims, 6 Drawing Sheets

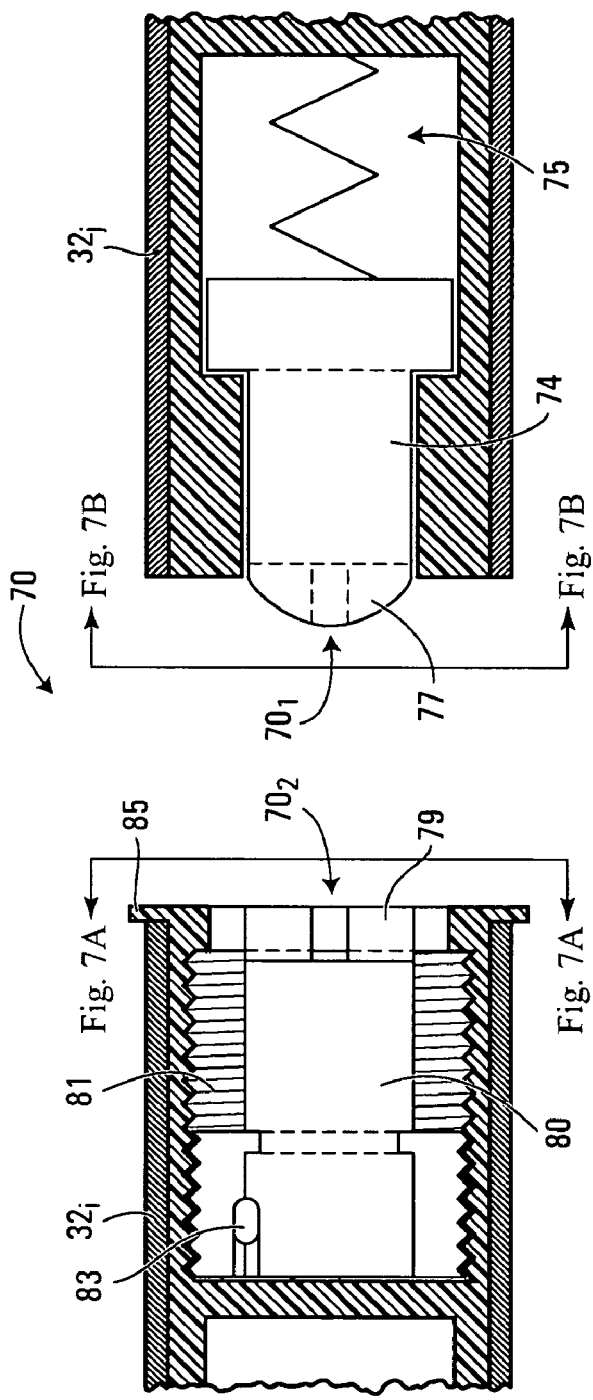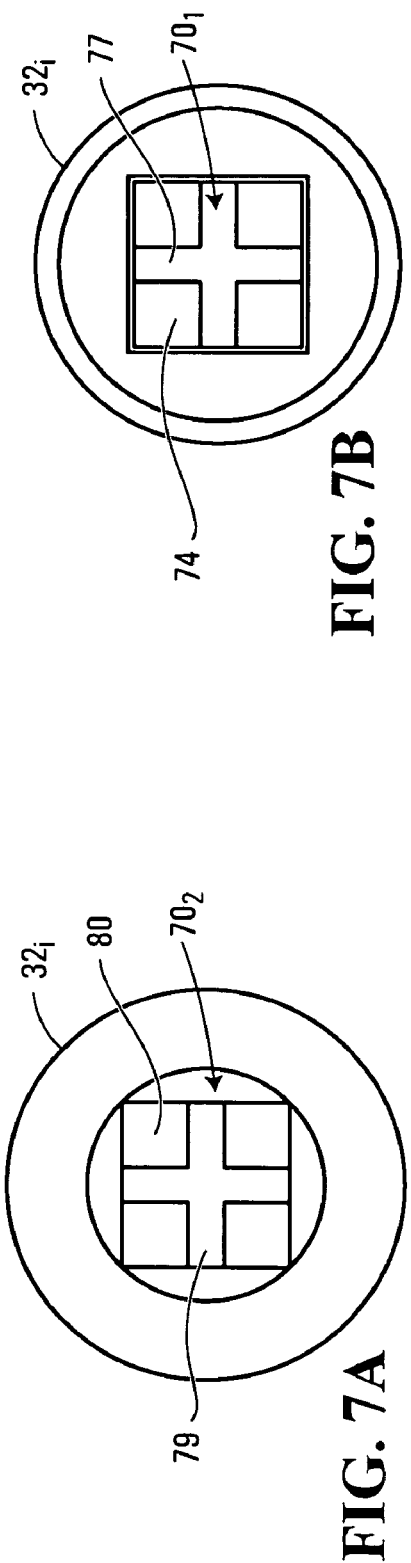
FIG. 7
FIG. 7B
FIG. 7A

METHOD AND APPARATUS FOR INHIBITING ACCRETION OF AIRBORNE MATERIAL ON A SURFACE OF AN AIRCRAFT

CROSS-REFERENCE TO RELATED APPLICATION

The present application claims priority from provisional application No. 60/474,215 filed on May 30, 2003.

FIELD OF THE INVENTION

The present invention relates to an apparatus for inhibiting accretion of airborne material on a surface of an aircraft. More particularly, the invention relates to an apparatus including a film moving relative to an external surface of an aircraft.

BACKGROUND OF THE INVENTION

In a modern civil aircraft, an important consideration is accretion of airborne material, such as ice particles and/or foreign bodies such as insects, on a leading edge of airfoils of the aircraft. Such accretion of airborne material is undesirable since it is detrimental to the aerodynamic performance of the airfoils and thus detrimental to the performance of the aircraft.

Conventionally, aircraft are provided with thermal anti-icing systems for reducing accretion of ice on the leading edge of airfoils. Thermal anti-icing systems typically draw hot bleed air from the compressor stages of the aircraft engines and distribute the bleed air inside the internal structure of the airfoils. A control system including various temperature sensors, modulated flow valves, and control electronics is used to ensure that the temperature of the airfoil skin is sufficiently hot to melt the ice accretion while remaining under a threshold temperature to prevent overheating and damaging the structure of the airfoil.

Thermal anti-icing systems suffer from multiple drawbacks, including:
  Aircraft performance loss due to bleed air extraction. Bleed air extraction from aircraft engines can cause a loss of net thrust of approximately 10% for a dual engine regime of operation and 20% for a single engine regime of operation. This translates into a payload penalty of approximately 5000 to 7000 lbs. for a typical 70-passenger regional jet.
  Proximity of heat source to wing fuel tank. The proximity of a heat source to the fuel tank located in the wing of an aircraft represents an inherent safety concern and a significant design challenge. Effort must be spent to assess the impact of control system failures, such as failure of a temperature sensor, on overheating considerations in order to ensure that the airfoil structure and the fuel tank remain unaffected.
  Risk of ice runback. Under certain conditions, the melted ice may run back on the top and bottom surfaces of the wing and refreeze thereon in the form of protrusions. Such protrusions are detrimental to the aerodynamic performance of the wing.
  Design complexity. The design of thermal anti-icing systems involves a complex mix of aerodynamics, thermodynamics, and control system theories which requires sophisticated tools and highly qualified personnel. The performance of the systems is also highly affected by installation variability.
  Foreign bodies contamination. Thermal anti-icing systems have a tendency to cook foreign bodies such as insects that may already be present on the leading edge of airfoils when the system is activated. Such cooking of foreign bodies renders more difficult cleaning of the airfoils and, over time, deteriorates the finish of the airfoil skin surface.

Pneumatic or electro-expulsive deicing systems are other conventional systems provided on aircraft for reducing accretion of ice on the leading edge of airfoils. Pneumatic deicing systems typically include a number of inflatable bladders, commonly referred to as boots, located on the leading edge of airfoils that break the ice accreting on the leading edge when the ice thickness is sufficiently large. Electro-expulsive deicing systems use repulsive forces from a magnetic field to deform the leading edge skin and to break an ice layer thereon.

Pneumatic or electro-expulsive deicing systems suffer from multiple drawbacks, including:
  Minimum ice accumulation requirement. A minimum thickness of accumulated ice on the leading edge is required in order for these deicing systems to function properly. This causes lift penalties.
  Leading edge surface distortion. Pneumatic boots are made of a rubber-type material and usually introduce some leading edge surface distortion when they are inflated. Such leading edge surface distortion is detrimental to the aerodynamic performance of the aircraft, especially in the case of high speed, high performance aircraft.
  Coverage area. Due to the difficulty for electro-expulsive systems to deform a large portion of the airfoil surface or to limitations on the number and size of pneumatic boots, the area of the airfoil surface that can be kept free of ice is typically smaller than that achieved using thermal anti-icing systems.
  Maximum speed of operation. The performance of pneumatic deicing systems reduces as the external pressure on the boots increases, i.e. as the airspeed increases.
  Maintenance and repair. The boots of pneumatic deicing systems frequently crack and need to be repaired. Typically, the boots are not easily removable and replaceable and thus repair of the boots usually consists in applying patches on the boot. The patches increase the potential of ice adhering to the boot.

Existing thermal anti-icing systems and pneumatic and electro-expulsive deicing systems thus suffer from various drawbacks that introduce multiple aircraft performance penalties. Furthermore, such systems are typically not designed to effectively inhibit accretion of foreign bodies such as insects on the leading edge of the airfoils. Accumulation of foreign bodies on the leading edge of the airfoils can have a significant impact on the aerodynamic performance of the airfoil.

Accordingly, there is a need in the industry for an apparatus for inhibiting accretion of airborne material on an airfoil leading edge that alleviates at least in part the problems associated with existing systems.

SUMMARY OF THE INVENTION

In accordance with a broad aspect, the invention provides an apparatus for inhibiting accretion of airborne material on at least a portion of an external surface of a leading edge portion of an airfoil. The apparatus comprises a film adapted to overlie the at least a portion of the external surface of the leading edge portion of the airfoil and a driver mechanism coupled to the film. The driver mechanism is operative to slideably move the film relative to the external surface of the leading edge portion of the airfoil.

In operation, airborne material such as ice particles and/or foreign bodies such as insects impinges on the film and tends to remain thereon. The sliding motion of the film relative to the external surface of the leading edge portion of the airfoil causes airborne material on the film to detach itself and break away from the film. In particular, the sliding motion of the film relative to the external surface of the leading edge portion of the airfoil induces variations in the curvature of the film which cause airborne material impinging and adhering on the film to detach itself and break away from the film.

In accordance with another broad aspect, the invention provides an airfoil including an apparatus for inhibiting accretion of airborne material on at least a portion of an external surface of a leading edge portion of the airfoil. The apparatus comprises a film adapted to overlie the at least a portion of the external surface of the leading edge portion of the airfoil and a driver mechanism coupled to the film. The driver mechanism is operative to slideably move the film relative to the at least a portion of the external surface of the leading edge portion of the airfoil.

In accordance with a further broad aspect, the invention provides a method for inhibiting accretion of airborne material on an external surface of a leading edge portion of an airfoil. The method comprises providing a film overlying at least a portion of the external surface of the leading edge portion of the airfoil. The method further comprises causing the film to slide relative to the at least a portion of the external surface of the leading edge portion of the airfoil.

In accordance with yet another broad aspect, the invention provides an apparatus for inhibiting accretion of airborne material on a surface of an aircraft. The apparatus comprises a film adapted to overlie at least a portion of the surface and a driver mechanism coupled to the film. The driver mechanism is operative to slideably move said film relative to the at least a portion of the surface.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of specific embodiments of the present invention is provided herein below, by way of example only, with reference to the accompanying drawings, in which:

FIG. 1 is a top view of an airfoil of an aircraft equipped with an apparatus for inhibiting accretion of airborne material on a leading edge of the airfoil in accordance with a specific example of implementation of the present invention;

FIG. 2 is a diagrammatic cross-sectional side elevation view of the airfoil equipped with the apparatus for inhibiting accretion of airborne material shown in FIG. 1;

FIG. 3 is a more detailed diagrammatic cross-sectional side elevation view of the airfoil equipped with the apparatus for inhibiting accretion of airborne material shown in FIG. 1, illustrating a driver mechanism of the apparatus;

FIG. 3A is an enlarged-scale diagrammatic view of a material removal unit of the apparatus for inhibiting accretion of airborne material shown in FIG. 3;

FIG. 7 is a diagrammatic cross-sectional front elevation view of a driver roller of the driver mechanism of the apparatus for inhibiting accretion of airborne material shown in FIG. 4, illustrating a connector system of the driver roller;

FIG. 7A is diagrammatic side elevation view of an end portion of a driver roller element of the driver roller shown in FIG. 7;

FIG. 7B is diagrammatic side elevation view of an end portion of another driver roller element of the driver roller shown in FIG. 7;

Figure 4:
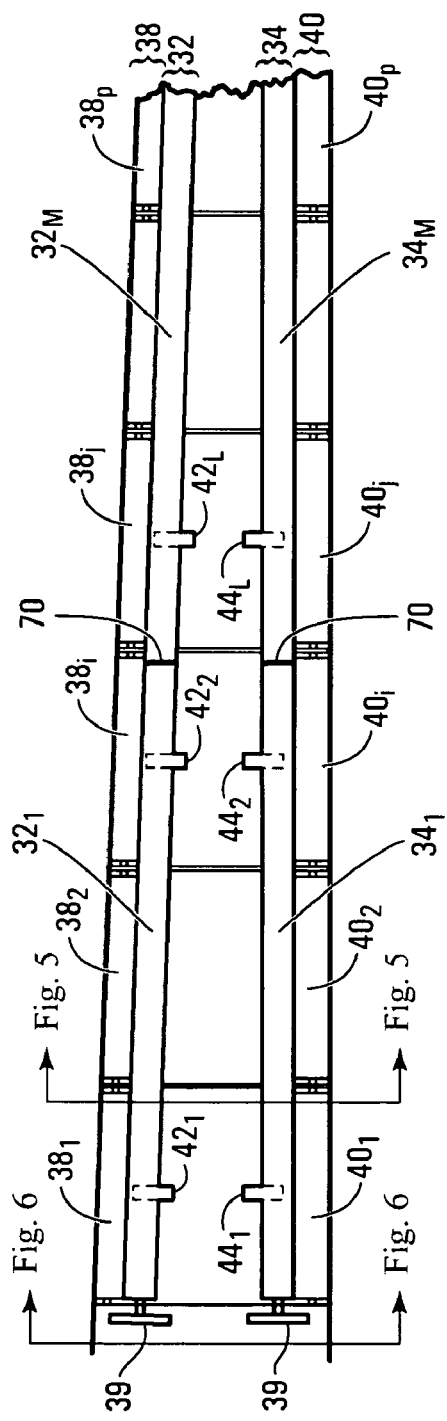
FIG. 4 is a diagrammatic cross-sectional front elevation view of the airfoil equipped with the apparatus for inhibiting accretion of airborne material shown in FIG. 3.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

Figures 1, 2:
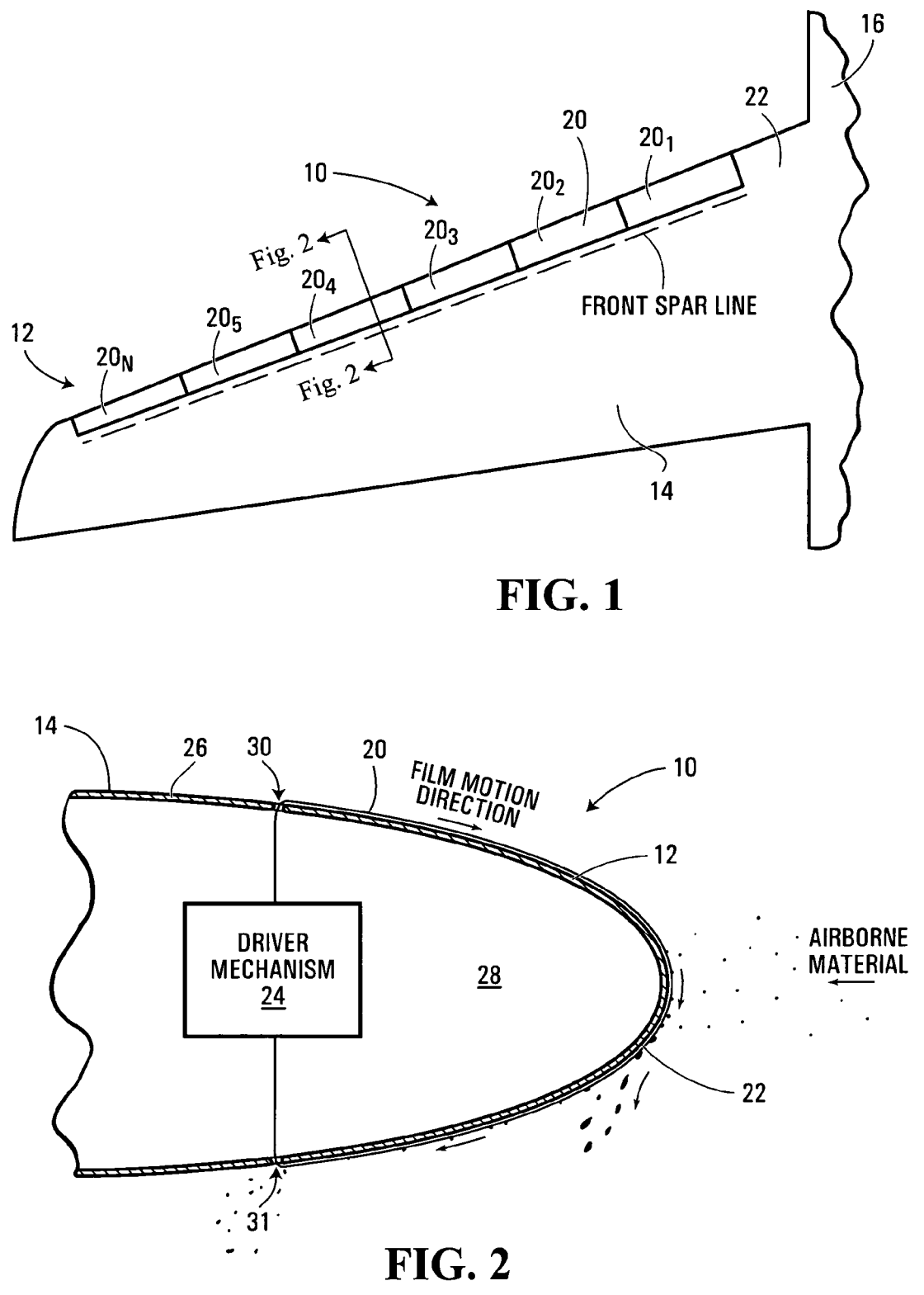

FIG. 1 shows an apparatus 10 for inhibiting accretion of airborne material on a leading edge portion 12 of an airfoil 14 in accordance with a specific non-limiting example of implementation of the invention. For the purposes of the present specification, accretion of airborne material on the leading edge portion 12 of the airfoil 14 refers to formation and accumulation of ice and/or accumulation of foreign bodies such as insects on the leading edge portion 12 of the airfoil 14. Such accretion of airborne material is undesirable since it is detrimental to the aerodynamic performance of an airfoil and, consequently, detrimental to the performance of an aircraft comprising the airfoil. In the specific example of implementation shown and described in the present specification, the airfoil 14 is a wing of an aircraft 16. However, it is to be understood that the apparatus 10 can also be used in connection with other types of airfoil, such as a rudder or an elevator, for example, without departing from the spirit and scope of the present invention.

With further reference to FIG. 2, the apparatus 10 comprises a film 20 adapted to overlie at least a portion of an external surface 22 of the leading edge portion 12 of the airfoil 14. The apparatus 10 also comprises a driver mechanism 24 coupled to the film 20. The driver mechanism 24 is operative to cause a sliding motion of the film 20 relative to the external surface 22 of the leading edge portion 12 of the airfoil 14. In the example shown, the film 20 overlies a portion of the external surface 22 of the leading edge portion 12 of the airfoil 14 extending from an area proximate to the tip of the airfoil 14 to an area proximate to the root of the airfoil 14. However, it is to be understood that the film 20 can be adapted to overlie a smaller or larger portion of the external surface 22 of the leading edge portion 12 of the airfoil 14. It is also to be understood that the leading edge portion 12 of the airfoil 14 refers to a portion of the airfoil 14 that includes the airfoil leading edge.

In the non-limiting example of implementation shown, the film 20 is under tension such as to follow a contour of the external surface 22 of the leading edge portion 12 of the airfoil 14. In addition, the airfoil 14 has a skin 26 that defines an interior space 28 and the apparatus 10 is configured such that a portion of the film 20 is located within the interior space 28 of the airfoil 14. The film 20 thus has a portion in motion within the interior space 28 of the airfoil 14 during operation of the apparatus 10. The film 20 extends from the external surface 22 of the leading edge portion 12 of the airfoil 14 to the interior portion 28 of the airfoil, and vice versa, through openings 30 and 31 in the airfoil skin 26.

In operation, the driver mechanism 24 is activated and controlled via a control unit (not shown) located, for instance, in the cockpit of the aircraft 16. Under operation of the driver mechanism 24, the film 20 moves in relation to the external surface 22 of the leading edge portion 12 of the airfoil 14 at a certain speed and in a certain direction (clockwise, in the example of implementation shown in FIG. 2). The speed of the moving film 20 is controllable and is sufficient to prevent an accretion of airborne material on the film 20 greater than a certain thickness. For instance, the speed of the film 20 can be approximately ¼ inch/second. The relatively low speed of the film 20 requires a very low level of power from the aircraft 16 such that the apparatus 10 can be operated continuously from takeoff to landing. Also, the driver mechanism 24 can be operated to cause a continuous motion or an intermittent motion of the film 20 when the apparatus 10 is in operation. Advantageously, the direction of motion of the film 20, from an upper level to a lower level of the external surface 22 of the leading edge portion 12, ensures that any accretion of airborne material on the film 20 is migrated below the airflow stagnation point, thereby mitigating the negative impact of any accretion of airborne material on stall characteristics of the airfoil 14.

During flight of the aircraft 16, airborne material such as ice particles and/or foreign bodies such as insects impinges on the film 20 and may remain thereon. The sliding motion of the film 20 relative to the external surface 22 of the leading edge portion 12 of the airfoil 14 causes airborne material on the film 20 to detach itself and break away from the film 20. More specifically, at a certain instant, airborne material impinges and remains on a particular portion of the film 20, the particular portion of the film 20 overlying a first particular area of the external surface 22 having a first particular curvature. Due to the motion of the film 20, at a subsequent instant, the particular portion of the film 20 on which the airborne material is present will overly a second particular area of the external surface 22 having a second particular curvature. The variation of curvature of the particular portion of the film 20 on which the airborne material is present causes the airborne material to break away and detach itself from the film 20. In addition, any airborne material remaining on the film 20 is removed from the film 20 as the film 20 passes through the opening 31 in the airfoil skin 26. Also, as described in further detail below, a material removal unit and a cleaning unit can optionally be provided to respectively remove airborne material remaining on the film 20 and clean one or more surfaces of the film 20. As also described below, the apparatus 10 is configured to facilitate installation, maintenance, repair and/or replacement of its various components.

Figures 3, 3A:
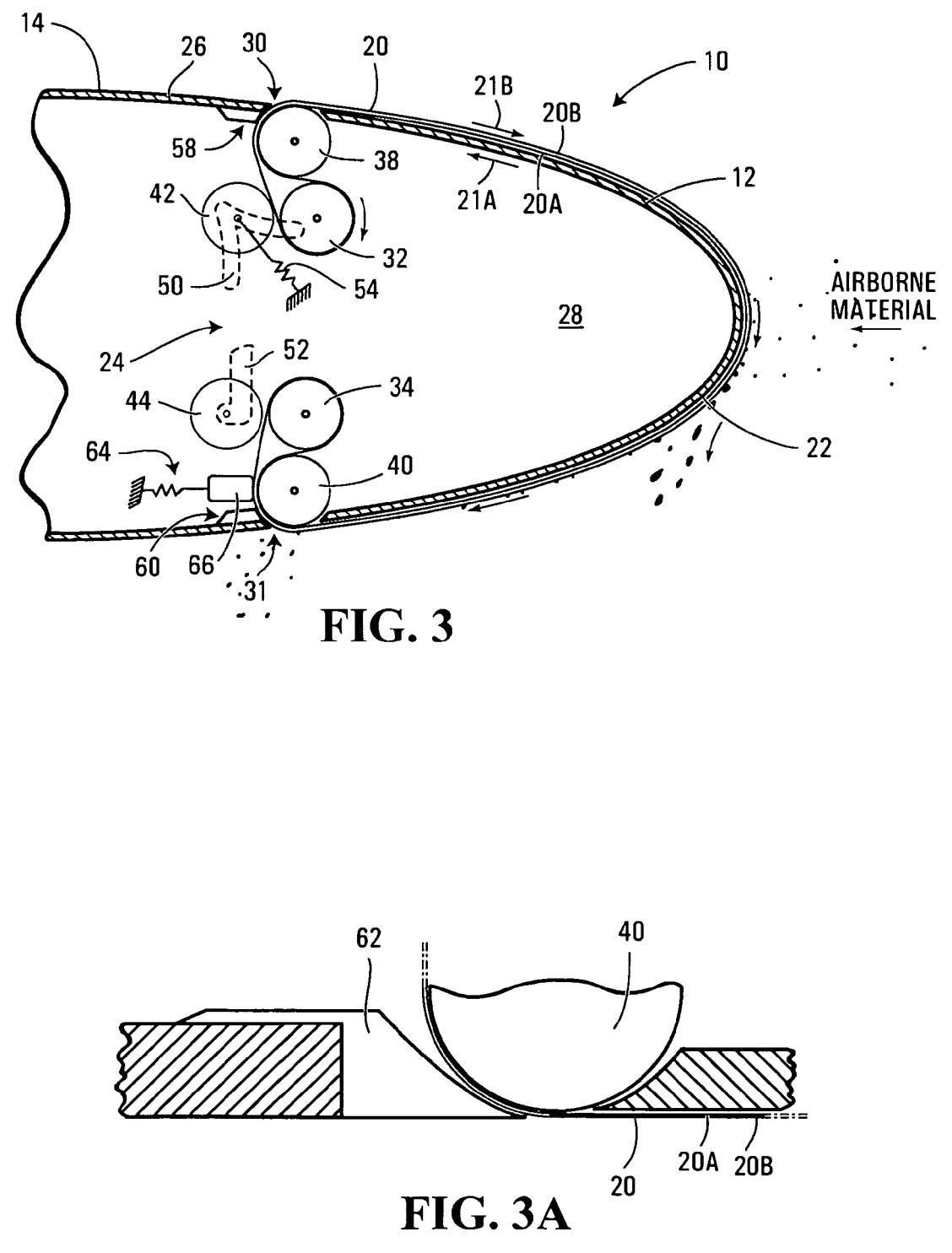

FIGS. 3 to 6 show a more detailed non-limiting example of implementation of the apparatus 10 for inhibiting accretion of airborne material on the leading edge portion 12 of the airfoil 14. Referring to FIG. 3, the film 20 is in a closed loop configuration such that the film 20 overlies the external surface 22 of the leading edge portion 12 of the airfoil 14 and has a portion located within the interior space 28 of the airfoil 14. Also, the driver mechanism 24 guides the film 20 such that the film 20 avoids extending across the interior space 28 of the airfoil 14. Advantageously, this allows implementation of the apparatus 10 in the airfoil 14 without significant impact on internal structural elements of the airfoil 14 and thus on the structural integrity of the airfoil 14. For example, this avoids having to cut through the internal structural elements of the airfoil 14 to allow the film 20 to cross from one side of the airfoil 14 to the opposite side thereof. Thus, in the specific example of implementation shown, the film 20 overlying the external surface 22 of the leading edge portion 12 of the airfoil 14 includes a first film portion 20A and a second film portion 20B overlying the first film portion 20A. Under the action of the driver mechanism 24, the first film portion 20A moves in a first direction 21A relative to the external surface 22 of the leading edge portion 12 and the second film portion 20B moves in a second direction 21B opposite to the first direction 21A.

The film 20 has a thickness sufficient to withstand impinging of airborne material and to move the impinged airborne material without failing. Advantageously, the thickness of the film 20 is kept as low as possible to lessen the effect of the film 20 on the external shape of the leading edge profile. The film 20 is made of a material exhibiting an adequate combination of tensile strength, flexibility, surface roughness (smoothness), and friction coefficient between the film 20 and the external surface 22 of the leading edge portion 12 of the airfoil 14. Advantageously, the film material also exhibits resistance to abrasions as particles of dust or sand may impact on the film 20 at high speed or become trapped between the film 20 and the external surface 22 of the leading edge portion 12. In a specific example of implementation, the film 20 is made of Teflon® impregnated fiberglass. It will be appreciated that the film 20 can be made of many other materials such as Nylon, Tivar® or any other suitable material without departing from the scope of the present invention.

Figure 6:
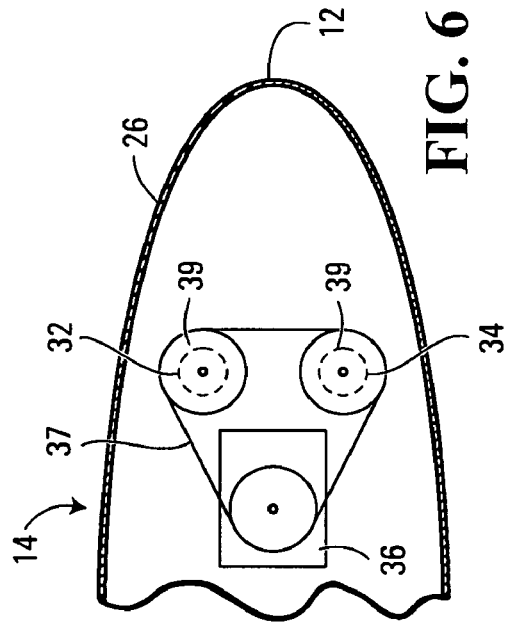
FIG. 6 is a diagrammatic cross-sectional side elevation view of the airfoil equipped with the apparatus for inhibiting accretion of airborne material shown in FIG. 4, illustrating a motor of the driver mechanism in a root area of the airfoil.
Figure 5:
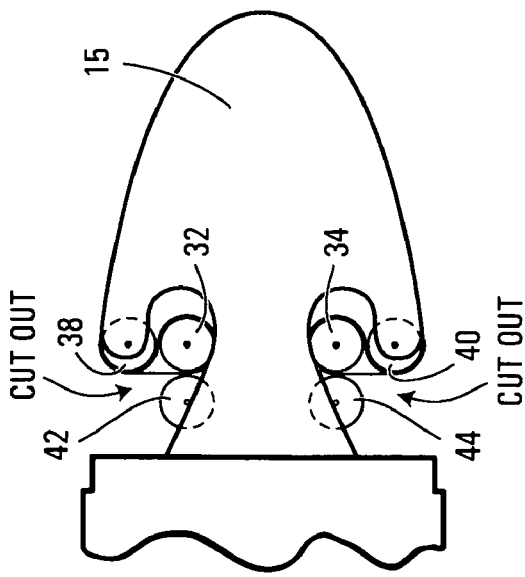
FIG. 5 is a diagrammatic cross-sectional side elevation view of internal structural elements of the airfoil equipped with the apparatus for inhibiting accretion of airborne material shown in FIG. 4.

In the non-limiting example of implementation shown in FIGS. 3 to 6, the driver mechanism 24 comprises a first driver roller 32 and a second driver roller 34 that are each coupled to the film 20. Optionally, the first and second driver rollers 32 and 34 are provided with a coating of a synthetic material to enhance the frictional coupling between the film 20 and the first and second driver rollers 32 and 34. As shown in FIG. 6, the driver mechanism 24 also comprises a motor 36 coupled to the first driver roller 32 and the second driver roller 34 to cause rotation of the first and second driver rollers 32 and 34. The rotation of the first and second driver rollers 32 and 34 causes the sliding motion of the film 20 relative to the external surface 22 of the leading edge portion 12 of the airfoil 14. In the specific embodiment shown, the motor 36 is located in a root area of the airfoil 14 and is coupled to the first and second driver rollers 32 and 34 via a gearbox and a drive belt (or chain) 37 interacting with sprockets 39 connected to the driver rollers 32 and 34.

In the particular example of implementation shown, the driver mechanism 24 further comprises a first guide roller 38 and a second guide roller 40 that are each rotatably coupled to internal structural elements of the airfoil 14, such as ribs 15 of the airfoil 14. During motion of the film 20, the first guide roller 38 guides the film 20 from the first driver roller 32 towards the external surface 22 of the leading edge portion 12 of the airfoil 14, and the second guide roller 40 guides the film 20 from the external surface 22 towards the second driver roller 34. Advantageously, the first and second guide rollers 38 and 40 are configured to guide the film 20 onto and from the external surface 22 of the leading edge portion 12 of the airfoil 14 such as to minimize the friction between the film 20 and the airfoil skin 26 at the openings 30 and 31 of the airfoil skin 26. For example, in a particular embodiment, each of the first and second guide rollers 38 and 40 is configured such that its rolling surface aligns with the external surface 22 of the leading edge portion 12 of the airfoil 14. In another embodiment, each of the first and second guide rollers 38 and 40 is located at a position where its rolling surface is in a substantially tangential relationship with the external surface 22 of the leading edge portion 12 of the airfoil 14.

In addition, the first and second guide rollers 38 and 40 provide support and stability to the first and second driver rollers 32 and 34. For instance, in the example of implementation shown, the first guide roller 38 is adjacent to the first driver roller 32 and interacts therewith via the film 20 to provide support and stability to the first driver roller 32. Similarly, the second guide roller 40 is adjacent to the second driver roller 34 and interacts therewith via the film 20 to provide support and stability to the second driver roller 34.

It will be appreciated that the first and second driver rollers 32 and 34 can be supported and stabilized by various other means, for instance by rotatably connecting them to internal structural elements of the airfoil 14 in the tip area of the airfoil 14 (i.e. the wing tip area in the case of a wing). In that case, the first and second guide rollers 38 and 40, if included, would enhance support and stability of the first and second driver rollers 32 and 34. It will also be appreciated that the first and second guide rollers 38 and 40 are purely optional since the first and second driver rollers 32 and 34 can be configured and positioned to effect the guidance of the film 20 provided by the first and second guide rollers 38 and 40.

In the particular example of implementation shown, the driver mechanism 24 also comprises a first locking wheel 42 and a second locking wheel 44 that are each coupled to internal structural elements of the airfoil 14, such as ribs 15 of the airfoil 14. The first and second locking wheels 42 and 44 interact with the film 20 and with the first and second driver rollers 32 and 34 to maintain the film 20 under a certain level of tension. Maintaining the film 20 under a certain level of tension ensures proper coupling between the film 20 and the first and second driver rollers 32 and 34 and close contact of the film 20 with the external surface 22 of the leading edge portion 12 of the airfoil 14. The interaction between the first locking wheel 42 and the first driver roller 32, as well as between the second locking wheel 44 and the second driver roller 34, also provides support and stability to the first and second driver rollers 32 and 34.

In the specific embodiment shown, the first and second locking wheels 42 and 44 are movable along respective openings 50 and 52 formed in internal structural elements of the airfoil 14. The openings 50 and 52 allow displacement of the first and second locking wheels 42 and 44 during installation or removal of the film 20, as will be described in further detail below. In addition, the openings 50 and 52 allow displacement of the first and second locking wheels 42 and 44 in order to maintain interaction of the wheels with the film 20 and with the first and second driver rollers 32 and 34 when the film 20 changes in length, for instance, as a result of temperature variations. For example, in the particular embodiment shown, the opening 50 allows displacement of the first locking wheel 42 along an arc of constant distance relative to the first guide roller 38 in order to maintain interaction of the wheel 42 with the film 20 and with the first driver roller 32. The first locking wheel 42 is also coupled to a spring element 54 such as to further maintain the film 20 under a certain level of tension.

In the specific example of implementation shown, the apparatus 10 further comprises material removal units 58 and 60 for removing airborne material adhered on the film 20. As shown in FIG. 3A, each of the material removal units 58 and 60 includes a scraper 62 adapted to remove airborne material adhered on a surface of the film 20 as the film 20 moves relative to the scraper 62. Each scraper 62 can be made of synthetic material such as nylon, for example, or from any suitable material. In the embodiment shown, the scraper 62 of each of the material removal units 58 and 60 is coupled to the airfoil skin 26 adjacent to one of the openings 30 and 31 and is configured to close any gap between the film 20 and the airfoil skin 26 in the vicinity of the openings 30 and 31. Advantageously, this ensures a continuous surface in the vicinity of the openings 30 and 31 for maintaining optimal aerodynamic efficiency.

The apparatus 10 optionally comprises a cleaning unit 64 for cleaning the film 20. In the embodiment shown, the cleaning unit 64 includes a cleaning element 66 adapted to clean the film 20 as the film 20 moves relative to the cleaning element 66. Advantageously, the cleaning element 66 is spring-loaded to maintain constant contact between the cleaning element 66 and the film 20. The cleaning element 66 can be made of felt-type material or any suitable material and can be impregnated with a liquid cleaning solution. One or more perforations can be formed in the airfoil skin 26 to allow draining of any airborne material removed from the film 20 and of liquid cleaning solution used during cleaning of the film 20 by the cleaning unit 64.

It will thus be appreciated that the film 20 cooperates with the other components of the apparatus 10 to inhibit accretion of airborne material on the leading edge portion 12 of the airfoil 14. Specifically, rotation of the first and second driver rollers 32 and 34 causes motion of the film 20 such that the film 20 passes partly around the first driver roller 32, between the first driver roller 32 and the first locking wheel 42, and is guided by the first guide roller 38 towards the external surface 22 of the leading edge portion 12 of the airfoil 14. As the film 20 passes through the opening 30, the scraper 62 of the material removing unit 58 removes any airborne material present on the surface of the film 20. The film portion 20B, overlying the film portion 20A, then moves relative to and follows the contour of the external surface 22 of the leading edge portion 12 towards the opening 31 in the airfoil skin 26. The motion of the film 20 relative to the external surface 22 of the leading edge portion 12 of the airfoil 14 induces variations in the curvature of the film 20 which cause airborne material impinging and adhering on the film 20 (in this case, on the film portion 20B) to detach itself and break away from the film 20. As the film 20 passes through the opening 31, the scraper 62 of the material removing unit 60 removes any airborne material remaining on the surface of the film 20. The film 20 is then guided by the second guide roller 40 from the external surface 22 of the leading edge portion 12 of the airfoil 14 towards the second driver roller 34. On its way, the film 20 is cleaned by the cleaning element 66 of the cleaning unit 64. The film 20 then continues between the second driver roller 34 and the second locking wheel 44, passes partly around the second driver roller 34, and is guided by the second guide roller 40 towards the external surface 22 of the leading edge portion 12 of the airfoil 14. The film portion 20A, under the film portion 20B, then moves relative to, and follows the contour of, the external surface 22 of the leading edge portion 12 towards the opening 30 in the airfoil skin 26. The film 20 is then guided by the first guide roller 38 from the external surface 22 of the leading edge portion 12 of the airfoil 14 towards the first driver roller 32 where the cycle repeats itself.

In order to reduce the friction between the film 20 and the external surface 22 of the leading edge portion 12 of the airfoil 14 as the film 20 moves relative to the external surface 22, a friction reducing coating, such as a Teflon® coating, can be provided on the external surface 22 of the leading edge portion 12. Optionally, the apparatus 10 can also include a lubricant application unit (not shown) mounted within the interior space 28 of the airfoil 14 to apply a lubricant on the film 20 during passage of the film 20 inside the interior space 28 of the airfoil 14.

With continued reference to FIGS. 1 to 6, the apparatus 10 is configured to facilitate installation, maintenance, repair and/or replacement of its various components. In the non-limiting example of implementation shown, the film 20 includes a plurality of adjacent film segments $20_1$–$20_N$. Each one of the film segments $20_1$–$20_N$ is independently installable in and removable from the apparatus 10. This facilitates installation, maintenance, repair, and replacement of a particular one of the film segments $20_1$–$20_N$ without affecting other ones of the film segments $20_1$–$20_N$. Advantageously, this also reduces the effects of a failure in a particular one of the film segments $20_1$–$20_N$, such as a tear of the film material, since the failure is prevented from propagating to other ones of the film segments $20_1$–$20_N$.

In other words, this prevents propagation of a failure in the film 20 over the entire length of the film 20 along the airfoil span. Also, in the embodiment shown, each one of the film segments $20_1$–$20_N$ has a tapered configuration such as to conform to the external surface 22 of the leading edge portion 12 of the airfoil 14 along the span of the airfoil 14.

Furthermore, in the particular example of implementation shown, the first guide roller 38 includes a plurality of guide roller elements $38_1$–$38_P$ and the second guide roller 40 includes a plurality of guide roller elements $40_1$–$40_P$. Each one of the guide roller elements $38_1$–$38_P$ and each one of the guide roller elements $40_1$–$40_P$ is rotatably connected to internal structural elements of the airfoil 14, such as ribs 15 of the airfoil 14. This facilitates installation, maintenance, repair, and replacement of a particular one of the guide roller elements $38_1$–$38_P$ or of the guide roller elements $40_1$–$40_P$ without affecting other ones of the guide roller elements $38_1$–$38_P$ and of the guide roller elements $40_1$–$40_P$.

Additionally, the first driver roller 32 includes a plurality of driver roller elements $32_1$–$32_M$ and the second driver roller 34 includes a plurality of driver roller elements $34_1$–$34_M$. In the particular embodiment shown, each one of the driver roller elements $32_1$–$32_M$ spans a number of guide roller elements $38_1$–$38_P$ and extends through cutouts in internal structural elements of the airfoil 14, such as ribs 15 of the airfoil 14. Each one of the driver roller elements $32_1$–$32_M$ also has a varying diameter along its span such as to accommodate the dimensions of the particular ones of the film segments $20_1$–$20_N$ that it is driving and to ensure that all of the film segments $20_1$–$20_N$ move synchronously. Similarly, each one of the driver roller elements $34_1$–$34_M$ spans a number of guide roller elements $40_1$–$40_P$, extends through cutouts in internal structural elements of the airfoil 14, and has a varying diameter along its span.

Adjacent ones of the driver roller elements $32_1$–$32_M$ are interconnected by a respective connector system 70. The connector system 70 allows transmission of torque between the adjacent ones of the driver roller elements $32_1$–$32_M$ but also allows the adjacent ones of the driver roller elements $32_1$–$32_M$ to be disconnected from each other for installation, maintenance, repair, and replacement purposes. Similarly, adjacent ones of the driver roller elements $34_1$–$34_M$ are also interconnected by a respective connector system 70. In the embodiment shown, the apparatus 10 also includes a detector unit (not shown) to detect disconnection, jamming, or other failure of the driver roller elements $32_1$–$32_M$ and the driver roller elements $34_1$–$34_M$ during operation of the apparatus 10.

FIGS. 7, 7A and 7B show a non-limiting example of implementation of the connector system 70 interconnecting adjacent ones of the driver roller elements $32_1$–$32_M$ and adjacent ones of the driver roller elements $34_1$–$34_M$. For purposes of illustration, the connector system 70 is shown as interconnecting two adjacent driver roller elements $32_i$ and $32_j$ of the driver roller elements $32_1$–$32_M$ part of the first driver roller 32. It will be appreciated that a similar connector system 70 is used in interconnecting adjacent ones of the driver roller elements $34_1$–$34_M$ part of the second driver roller 34. The connector system 70 includes a first connecting element $70_1$ in an end portion of the driver roller element $32_j$ and a second connecting element $70_2$ in an end portion of the driver roller element $32_i$. The first and second connecting elements $70_1$ and $70_2$ cooperate to transmit torque between the driver roller elements $32_i$ and $32_j$ and are adapted to move along a connection axis of the driver roller elements $32_i$ and $32_j$.

The first connecting element $70_1$ includes a spring-loaded element 74 adapted to slide within a cavity 75. The cavity 75 has a noncircular cross-section to prevent rotation of the spring-loaded element 74 within the cavity 75. The second connecting element $70_2$ includes a threaded element 80 adapted to move in a complementary threaded cavity 81. The first and second connecting elements $70_1$ and $70_2$ are connected via a curved male part 77 of the spring-loaded element 74 and a complementary female fitting 79 of the threaded element 80. The driver roller elements $32_i$ and $32_j$ are positively locked with respect to each other by fixing the last driver roller element in the airfoil tip area and actuating the motor 36, which causes rotation of the driver roller elements $32_i$ and $32_j$. The relative rotation between the driver roller elements $32_i$ and $32_j$ causes the threaded element 80, through interaction with the threaded cavity 81, to move towards and partly enter the cavity 75. To unlock the driver roller elements $32_i$ and $32_j$, the motor 36 is operated to cause rotation of the driver roller elements $32_i$ and $32_j$ in the opposite direction. In the specific embodiment shown, the threaded element 80 is provided with a pre-calibrated over-torque protection key 83 adapted to shear in the event of jamming of one of the driver roller elements $32_1$–$32_M$ and $34_1$–$34_M$ during operation of the apparatus 10 such as to prevent damaging the apparatus 10. A ledge 85 is also provided on each one of the driver roller elements $32_1$–$32_M$ and $34_1$–$34_M$ such as to prevent outboard migration of the film segments $20_1$–$20_N$.

It will thus be appreciated that the apparatus 10 is configured to facilitate installation, maintenance, repair and/or replacement of its various components. For example, with reference to FIGS. 1 to 6, a particular one of the film segments $20_1$–$20_N$ can be removed by first temporarily removing a panel of airfoil skin 26 on the top and bottom sides of the airfoil 14 proximate to the film segment to be removed. The first locking wheels $42_1$–$42_L$ are then moved along openings 50 to a position sufficiently distant from the first guide rollers $38_1$–$38_P$ to allow passage of the first driver rollers $32_1$–$32_M$ between the first locking wheels $42_1$–$42_L$ and the first guide rollers $38_1$–$38_P$. The particular one of the first driver rollers $32_1$–$32_M$ to which is coupled the film segment to be removed is disconnected from adjacent ones of the first driver rollers $32_1$–$32_M$ via the connector system 70, as described above. The disconnected first driver roller is then removed from the interior space 28 of the airfoil 14. Similarly, the second locking wheels $44_1$–$44_L$ are then moved along openings 52 to a position sufficiently distant from the second guide rollers $40_1$–$40_P$ to allow passage of the second driver rollers $34_1$–$34_M$ between the first locking wheels $44_1$–$44_L$ and the second guide rollers $40_1$–$40_P$. The particular one of the second driver rollers $34_1$–$34_M$ to which is coupled the film segment to be removed is disconnected from adjacent ones of the second driver rollers $34_1$–$34_M$ via the connector system 70, as described above. The disconnected second driver roller is then removed from the interior space 28 of the airfoil 14 and the film segment to be removed is uncoupled from the removed first and second driver rollers. To install a particular one of the film segments $20_1$–$20_N$, the reverse procedure is followed.

Figure 8:
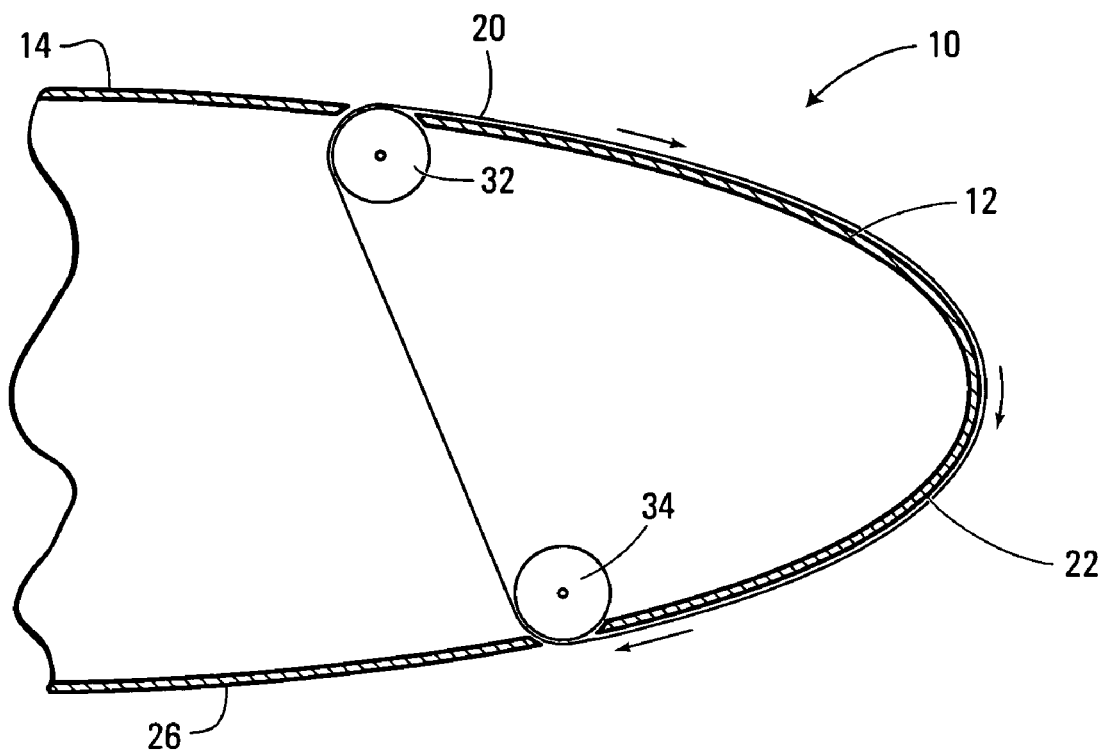
FIG. 8 is a more detailed diagrammatic cross-sectional side elevation view of the airfoil equipped with the apparatus for inhibiting accretion of airborne material shown in FIG. 1, illustrating another example of implementation of a driver mechanism of the apparatus.
Figure 9:
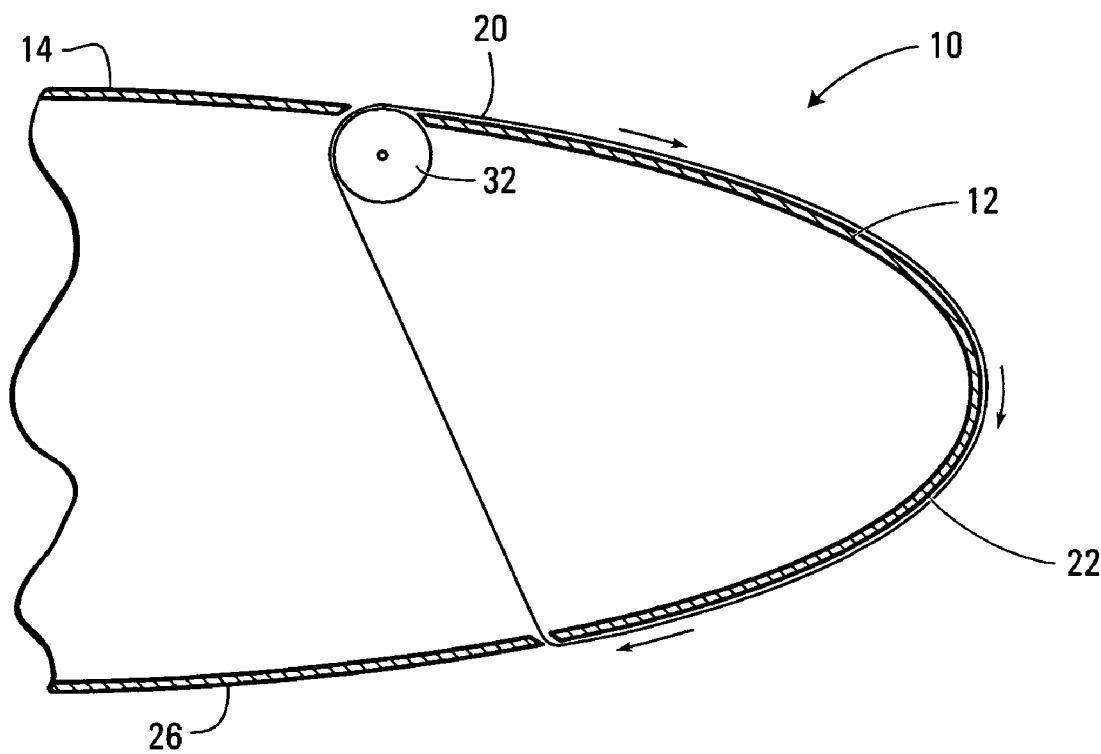
FIG. 9 is a more detailed diagrammatic cross-sectional side elevation view of the airfoil equipped with the apparatus for inhibiting accretion of airborne material shown in FIG. 1, illustrating a further example of implementation of a driver mechanism of the apparatus.

The specific example of implementation of the apparatus 10 described above was presented for illustrative purposes only as it will be appreciated that various modifications can be made to the apparatus 10 without departing from the spirit and scope of the present invention. For example, FIG. 8 shows an example of implementation of the apparatus 10 in which only the first and second driver rollers 32 and 34 are included, with the first and second guide rollers 38 and 40 and the first and second locking wheel 42 and 44 being omitted. FIG. 9 shows another example of implementation of the apparatus 10 in which only the first driver roller 32 is included to cause motion of the film 20 relative to the external surface 22 of the leading edge portion 12 of the airfoil 14.

Figure 10:
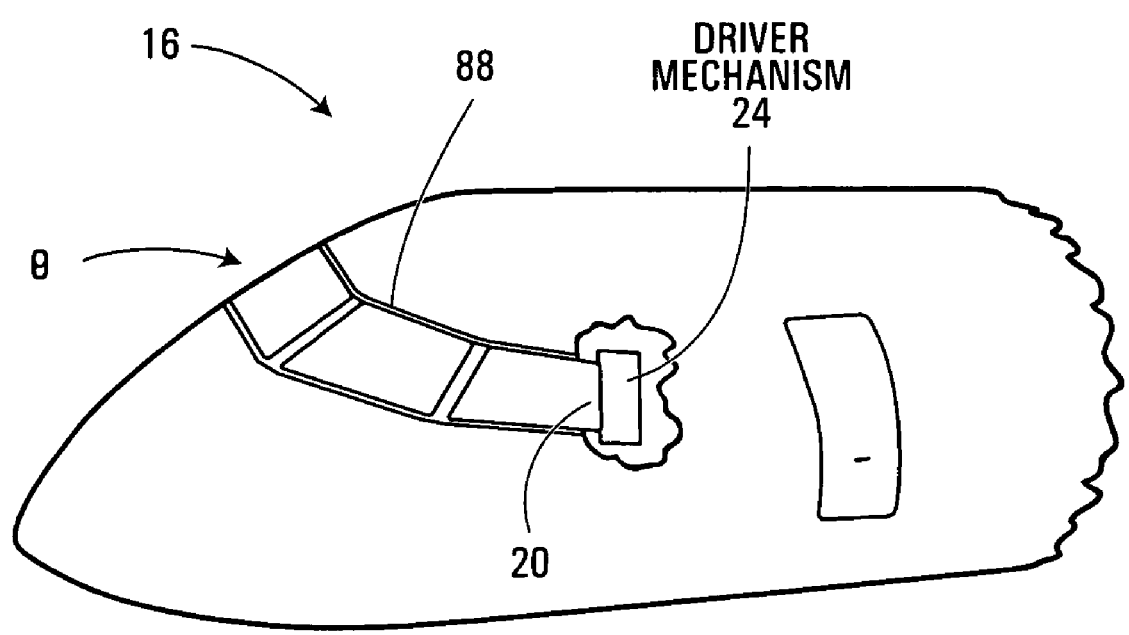
FIG. 10 is an isometric view of a portion of an aircraft equipped with an apparatus for inhibiting accretion of airborne material on an external surface of a window of the aircraft in accordance with a specific example of implementation of the present invention.

Finally, FIG. 10 shows an example of implementation in which the apparatus 10 is adapted and used for inhibiting accretion of airborne material on a surface 88 of the aircraft 16. In this non-limiting example of implementation, the apparatus 10 is adapted and used for inhibiting accretion of airborne material on a portion of an external surface 88 of a window 90 of the aircraft 16, the window 90 being a windshield of the cockpit of the aircraft 16. In this case, the film 20 is adapted to overlie the portion of the external surface 88 of the window 90 and is made of a transparent material. The driver mechanism 24 is coupled to the film 20 and is operative to cause motion of the film 20 relative to the external surface 88 of the window 90. During flight of the aircraft 16, airborne material such ice particles and/or foreign bodies such as insects impinges on the film 20 and may remain thereon. Under action of the driver mechanism 24, the motion of the film 20 relative to the external surface 88 of the window 90 causes airborne material on the film 20 to detach itself and break away from the film 20.

Although various embodiments have been illustrated, this was for the purpose of describing, but not limiting, the invention. Various modifications will become apparent to those skilled in the art and are within the scope of the present invention, which is defined more particularly by the attached claims.

The invention claimed is:

1. An apparatus for inhibiting accretion of airborne material on at least a portion of an external surface of a leading edge portion of an airfoil, the airfoil having an interior space, said apparatus comprising:
   a) a film adapted to overlie the at least a portion of the external surface of the leading edge portion of the airfoil, said film being characterized by a closed loop configuration whereby said film overlies the at least a portion of the external surface of the leading edge portion of the airfoil and has a portion located within the interior space of the airfoil; and
   b) a driver mechanism coupled to said film, said driver mechanism being operative to slideably move said film relative to the at least a portion of the external surface of the leading edge portion of the airfoil, said driver mechanism guiding said film such that the portion of the film located within the interior space of the airfoil does not extend across the interior space of the airfoil.

2. An apparatus as defined in claim 1, wherein, when in motion, said film is characterized by a tension such that said film follows the at least a portion of the external surface of the leading edge portion of the airfoil.

3. An apparatus for inhibiting accretion of airborne material on at least a portion of an external surface of a leading edge portion of an airfoil, said apparatus comprising:
   a) a film adapted to overlie the at least a portion of the external surface of the leading edge portion of the airfoil; and
   b) a driver mechanism coupled to said film, said driver mechanism being operative to slideably move said film relative to the at least a portion of the external surface of the leading edge portion of the airfoil;
   wherein said film includes a first film portion and a second film portion, said first film portion overlying the at least a portion of the external surface of the leading edge portion of the airfoil, said second film portion overlying said first film portion, and wherein, when said film is in motion, said first film portion moves in a first direction relative to the at least a portion of the external surface of the leading edge portion of the airfoil and said second film portion moves in a second direction opposite to the first direction.

4. An apparatus as defined in claim 1, wherein said film has a thickness sufficient to withstand impinging of airborne material.

5. An apparatus as defined in claim 1, wherein said driver mechanism is operative to cause a continuous sliding motion of said film relative to the at least a portion of the external surface of the leading edge portion of the airfoil.

6. An apparatus as defined in claim 1, wherein said driver mechanism is operative to cause an intermittent sliding motion of said film relative to the at least a portion of the external surface of the leading edge portion of the airfoil.

7. An apparatus as defined in claim 1, wherein said driver mechanism is operative to control a speed of motion of said film, the speed of motion being controlled to prevent an accretion of airborne material on the film greater than a certain thickness.

8. An apparatus as defined in claim 1, wherein said driver mechanism is operative to slideably move a particular portion of said film such that said particular portion of said film is displaced from a relative upper level to a relative lower level of the at least a portion of the external surface of the leading edge portion of the airfoil.

9. An apparatus for inhibiting accretion of airborne material on at least a portion of an external surface of a leading edge portion of an airfoil, said apparatus comprising:
   a) a film adapted to overlie the at least a portion of the external surface of the leading edge portion of the airfoil; and
   b) a driver mechanism coupled to said film, said driver mechanism being operative to slideably move said film relative to the at least a portion of the external surface of the leading edge portion of the airfoil, said driver mechanism comprising:
      a driver roller coupled to said film, said driver roller being provided with a coating of a synthetic material for enhancing the coupling between said film and said driver roller; and
      a motor coupled to said driver roller, wherein actuation of said motor causes rotation of said driver roller, the rotation of said driver roller causing said film to slide relative to the at least a portion of the external surface of the leading edge portion of the airfoil.

10. An apparatus as defined in claim 9, wherein said driver mechanism further comprises a guide roller to guide the film in motion from said driver roller onto the at least a portion of the external surface of the leading edge portion of the airfoil.

11. An apparatus as defined in claim 10, wherein a rolling surface of said guide roller aligns with the at least a portion of the external surface of the leading edge portion of the airfoil.

12. An apparatus as defined in claim 9, wherein said driver mechanism further comprises a locking wheel interacting with said film to maintain said film in motion under a certain level of tension.

13. An apparatus as defined in claim 1, further comprising a material removal unit operative to remove airborne material adhering to said film.

14. An apparatus as defined in claim 13, wherein said material removal unit includes a scraper adapted to remove airborne material adhered to said film as said film moves relative to said scraper.

15. An apparatus as defined in claim 1, further comprising a cleaning unit for cleaning said film.

16. An apparatus as defined in claim 15, wherein said cleaning unit includes a cleaning element adapted to clean said film as said film moves relative to said cleaning element.

17. An apparatus for inhibiting accretion of airborne material on at least a portion of an external surface of a leading edge portion of an airfoil, the airfoil having an interior space, said apparatus comprising:
   a) a film adapted to overlie the at least a portion of the external surface of the leading edge portion of the airfoil, said film being characterized by a closed loop configuration whereby said film overlies the at least a portion of the external surface of the leading edge portion of the airfoil and has a portion located within the interior space of the airfoil;
   b) a driver mechanism coupled to said film, said driver mechanism being operative to slideably move said film relative to the at least a portion of the external surface of the leading edge portion of the airfoil; and
   c) a lubricant application unit within the interior space of the airfoil to apply a lubricant on said film during passage of said film within the interior space of the airfoil.

18. An apparatus as defined in claim 1, wherein said film includes a plurality of adjacent film segments, each one of said film segments being independently removable from said apparatus.

19. An apparatus for inhibiting accretion of airborne material on at least a portion of an external surface of a leading edge portion of an airfoil, said apparatus comprising:
   a) a film adapted to overlie the at least a portion of the external surface of the leading edge portion of the airfoil; and
   b) a driver mechanism coupled to said film, said driver mechanism being operative to slideably move said film relative to the at least a portion of the external surface of the leading edge portion of the airfoil, said driver mechanism comprising:
      a driver roller coupled to said film, said driver roller including a plurality of driver roller elements, each one of said driver roller elements being independently removable from said apparatus, wherein adjacent driver roller elements are interconnected by a respective connector system, said connector system allowing transmission of torque between the adjacent driver roller elements and allowing the adjacent driver roller elements to be disconnected from each other by rotation of one of the adjacent driver roller elements relative to the other one of the adjacent driver roller elements; and
      a motor coupled to said driver roller, wherein actuation of said motor causes rotation of said driver roller, the rotation of said driver roller causing said film to slide relative to the at least a portion of the external surface of the leading edge portion of the airfoil.

20. An apparatus as defined in claim 19, wherein said connector system includes a first connecting element in an end portion of one of the adjacent driver roller elements and a second connecting element in an end portion of the other one of the adjacent driver roller elements, said first and second connecting elements cooperating to transmit torque between the adjacent driver roller elements and being adapted to move along a connection axis of the adjacent driver roller elements under rotation of one of the adjacent driver roller elements relative to the other one of the adjacent driver roller elements.

21. An apparatus as defined in claim 20, wherein said first connecting element includes a spring-loaded element adapted to slide within a cavity, the cavity being adapted to prevent rotation of the spring-loaded element within the cavity, and said second connecting element includes a threaded element adapted to move in a complementary threaded cavity.

22. An apparatus as defined in claim 1, wherein said driver mechanism comprises:
   a) a first driver roller coupled to said film;
   b) a second driver roller coupled to said film; and
   c) a motor coupled to said first and second driver rollers;
   wherein actuation of said motor causes rotation of said first and second driver rollers, the rotation of said first and second driver rollers causing said film to slide relative to the at least a portion of the external surface of the leading edge portion of the airfoil.

23. An apparatus as defined in claim 22, wherein said driver mechanism further comprises a first guide roller to guide said film in motion from said first driver roller onto the at least a portion of the external surface of the leading edge portion of the airfoil, and a second guide roller to guide said film in motion from the at least a portion of the external surface of the leading edge portion of the airfoil towards the second driver roller.

24. An apparatus as defined in claim 23, wherein a rolling surface of said first guide roller and a rolling surface of said second guide roller align with the at least a portion of the external surface of the leading edge portion of the airfoil.

25. An apparatus as defined in claim 3, wherein, when in motion, said film is characterized by a tension such that said film follows the at least a portion of the external surface of the leading edge portion of the airfoil.

26. An apparatus as defined in claim 3, wherein said film has a thickness sufficient to withstand impinging of airborne material.

27. An apparatus as defined in claim 3, wherein said driver mechanism is operative to cause a continuous sliding motion of said film relative to the at least a portion of the external surface of the leading edge portion of the airfoil.

28. An apparatus as defined in claim 3, wherein said driver mechanism is operative to cause an intermittent sliding motion of said film relative to the at least a portion of the external surface of the leading edge portion of the airfoil.

29. An apparatus as defined in claim 3, wherein said driver mechanism is operative to control a speed of motion of said film, the speed of motion being controlled to prevent an accretion of airborne material on the film greater than a certain thickness.

30. An apparatus as defined in claim 3, wherein said driver mechanism is operative to slideably move a particular portion of said film such that said particular portion of said film is displaced from a relative upper level to a relative lower level of the at least a portion of the external surface of the leading edge portion of the airfoil.

31. An apparatus as defined in claim 3, wherein said driver mechanism comprises:
  a driver roller coupled to said film; and
  a motor coupled to said driver roller;
  wherein actuation of said motor causes rotation of said driver roller, the rotation of said driver roller causing said film to slide relative to the at least a portion of the external surface of the leading edge portion of the airfoil.

32. An apparatus as defined in claim 31, wherein said driver roller is provided with a coating of a synthetic material for enhancing the coupling between said film and said driver roller.

33. An apparatus as defined in claim 31, wherein the driver mechanism further comprises a guide roller to guide the film in motion from said driver roller onto the at least a portion of the external surface of the leading edge portion of the airfoil.

34. An apparatus as defined in claim 33, wherein a rolling surface of said guide roller aligns with the at least a portion of the external surface of the leading edge portion of the airfoil.

35. An apparatus as defined in claim 31, wherein said driver mechanism further comprises a locking wheel interacting with said film to maintain said film in motion under a certain level of tension.

36. An apparatus as defined in claim 3, said apparatus further comprising a material removal unit operative to remove airborne material adhering to said film.

37. An apparatus as defined in claim 36, wherein said material removal unit includes a scraper adapted to remove airborne material adhered to said film as the film moves relative to said scraper.

38. An apparatus as defined in claim 3, said apparatus further comprising a cleaning unit for cleaning said film.

39. An apparatus as defined in claim 38, wherein said cleaning unit includes a cleaning element adapted to clean said film as said film moves relative to said cleaning element.

40. An apparatus as defined in claim 3, wherein said film includes a plurality of adjacent film segments, each one of said film segments being independently removable from said apparatus.

41. An apparatus as defined in claim 31, wherein said driver roller includes a plurality of driver roller elements, each one of said driver roller elements being independently removable from said apparatus.

42. An apparatus as defined in claim 41, wherein adjacent driver roller elements are interconnected by a respective connector system, said connector system allowing transmission of torque between the adjacent driver roller elements and allowing the adjacent driver roller elements to be disconnected from each other by rotation of one of the adjacent driver roller elements relative to the other one of the adjacent driver roller elements.

43. An apparatus as defined in claim 42, wherein said connector system includes a first connecting element in an end portion of one of the adjacent driver roller elements and a second connecting element in an end portion of the other one of the adjacent driver roller elements, said first and second connecting elements cooperating to transmit torque between the adjacent driver roller elements and being adapted to move along a connection axis of the adjacent driver roller elements under rotation of one of the adjacent driver roller elements relative to the other one of the adjacent driver roller elements.

44. An apparatus as defined in claim 43, wherein said first connecting element includes a spring-loaded element adapted to slide within a cavity, the cavity being adapted to prevent rotation of the spring-loaded element within the cavity, and said second connecting element includes a threaded element adapted to move in a complementary threaded cavity.

45. An apparatus as defined in claim 3, wherein said driver mechanism comprises:
  a) a first driver roller coupled to said film;
  b) a second driver roller coupled to said film; and
  c) a motor coupled to said first and second driver rollers;
  wherein actuation of said motor causes rotation of said first and second driver rollers, the rotation of said first and second driver rollers causing said film to slide relative to the at least a portion of the external surface of the leading edge portion of the airfoil.

46. An apparatus as defined in claim 45, wherein said driver mechanism further comprises a first guide roller to guide said film in motion from said first driver roller onto the at least a portion of the external surface of the leading edge portion of the airfoil, and a second guide roller to guide said film in motion from the at least a portion of the external surface of the leading edge portion of the airfoil towards said second driver roller.

47. An apparatus as defined in claim 46, wherein a rolling surface of said first guide roller and a rolling surface of said second guide roller align with the at least a portion of the external surface of the leading edge portion of the airfoil.

48. An airfoil comprising an apparatus as defined in claim 1.

49. An airfoil comprising an apparatus as defined in claim 3.

50. An airfoil comprising an apparatus as defined in claim 9.

51. An airfoil comprising an apparatus as defined in claim 17.

52. An airfoil comprising an apparatus as defined in claim 19.

* * * * *